Feb. 13, 1940. W. S. CLARKSON 2,190,530
TIRE GAUGE
Filed Nov. 22, 1937 2 Sheets-Sheet 1

Inventor
William S. Clarkson

Feb. 13, 1940.  W. S. CLARKSON  2,190,530
TIRE GAUGE
Filed Nov. 22, 1937  2 Sheets-Sheet 2
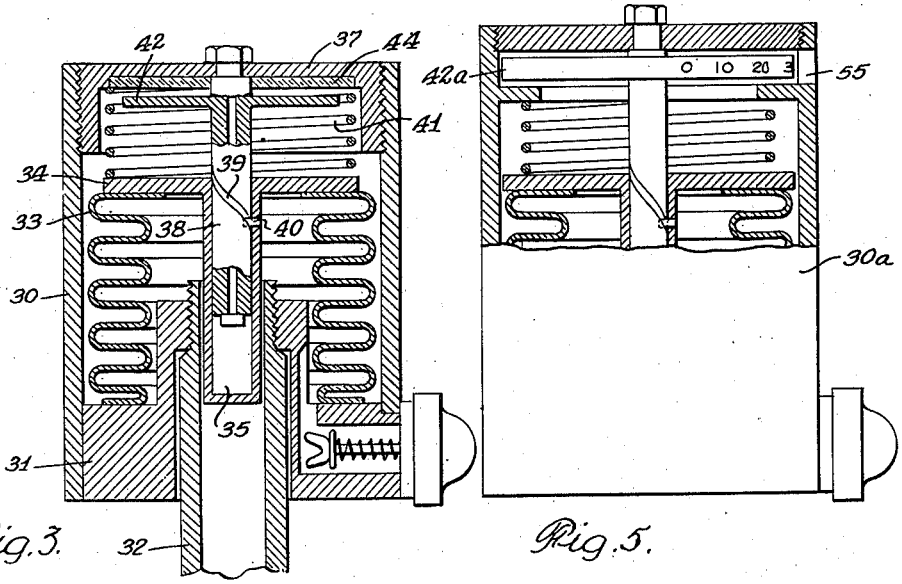
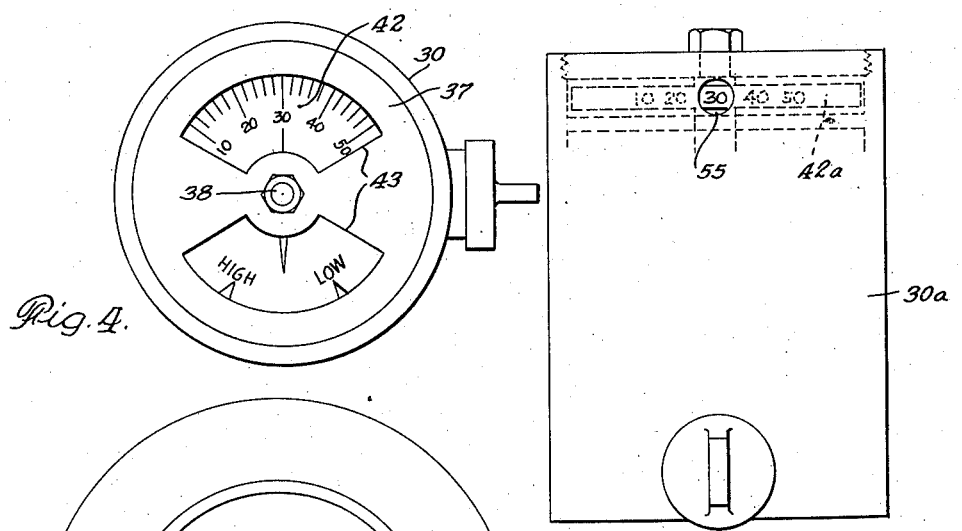
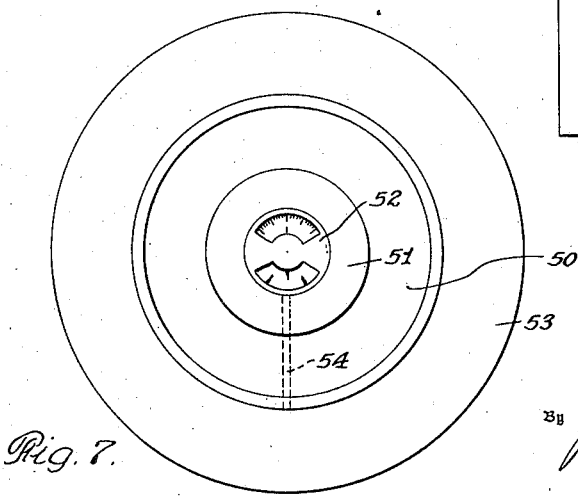

Patented Feb. 13, 1940

2,190,530

UNITED STATES PATENT OFFICE 2,190,530

TIRE GAUGE

William S. Clarkson, Ann Arbor, Mich.

Application November 22, 1937, Serial No. 175,763

4 Claims. (Cl. 73—110)

The present invention relates to gauges for indicating air, vapor or liquid pressure and more particularly gauges for indicating air pressure of automotive vehicle tires. It has for its primary object to provide an individual gauge at any place where the indication of air, vapor or liquid pressure is desired, and more specifically, for mounting on the several tires of a vehicle in order that the operator of a vehicle may readily observe the tire pressure.

Another object of the invention is to provide a pressure or tire gauge of this character embodying an expansible and contractible member adapted to expand and contract responsive to changes in air or liquid pressure. This expansible and contractible member is, preferably, a Sylphon bellows, and in combination therewith is provided a calibrated spring which yieldingly opposes expansion thereof whereby the expansion and contraction of the bellows has a definite and known relationship to the pressure changes. The condition of the bellows, as to expansion and contraction, may thus be utilized to indicate the air pressure in the tire or pressure unit.

Another object of the invention is to provide a gauge embodying an expansible and contractible member of the character above mentioned and means in association therewith for indicating, by the extent of expansion or contraction, the air pressure within a pressure member or, for example, a tire, said means being designed with a view to checking movement in the gauge for excessively rapid expansion or contraction whereby these movements, resulting from pressure changes due to road impacts, cannot materially shorten the useful life of the bellows by constant vibration. To this end, the bellows is secured stationary at one end and a disk-like closure is provided at its other end for movement in response to pressure changes in the bellows which is in communication with the interior of the pressure medium or tire. Yieldingly opposing movement of the disk-like closure is a calibrated spring. A rotating indicator disk has a stem provided with a shrouded cam or spiral groove, and a pin carried by the disk-like closure operates in the shrouded cam or groove whereby rotation of the indicating disk results from the axial movement of the disk-like closure.

With the above and other ends in view the invention is more fully disclosed with reference to the accompanying drawings, in which—

Fig. 3 is a vertical section of another form of the invention;

Fig. 4 is a top plan view thereof;

Fig. 5 is a view partly in section and partly in elevation of a modification;

Fig. 6 is an elevation corresponding to Fig. 5, and

Fig. 7 is an elevation illustrating an installation of a gauge in a wheel.

Like characters of reference are employed throughout to designate corresponding parts.

Figure 1:
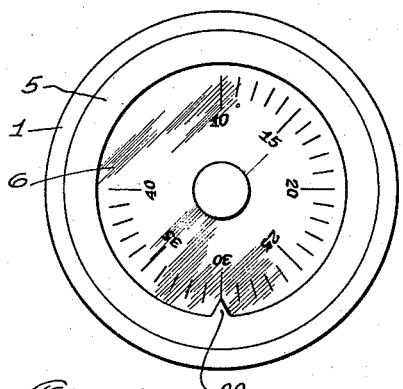
Figure 1 is a top plan view.
Figure 2:
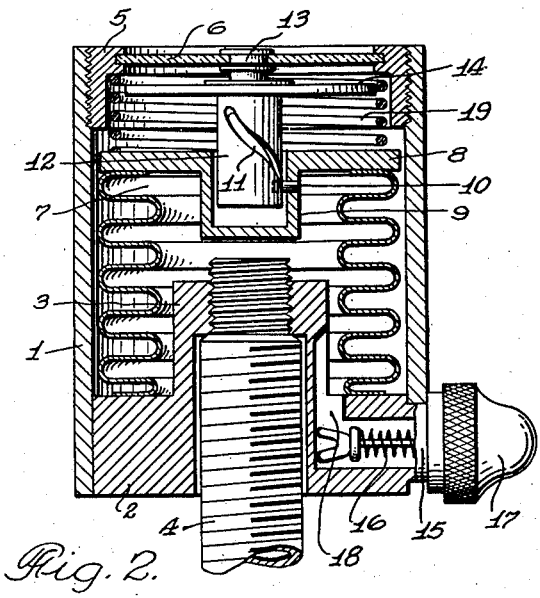
Fig. 2 is a vertical section.

A cylindrical body 1 has an end wall 2, permanently secured therein, and having an inwardly directed, hollow, internally threaded boss formation 3 for mounting the same upon the conventional hollow stem 4 of an automobile tire. At its upper end the cylindrical body 1 has a closure 5 with a transparency 6, the latter preferably being of the plastic type rather than glass.

Secured to the end wall 2, and surrounding the boss 3, is a Sylphon bellows 7 having a disk 8 on its other end formed with a cup 9. A pin 10 is mounted in the wall of the cup 9 and extends into a spiral groove or shrouded cam 11 in a spindle 12, the spindle 12 being rotatably mounted at 13 in the transparency 6 and having an indicator disk 14 mounted thereon and provided with indicia, as shown in Fig. 1.

The gauge is mounted upon the hollow stem 4, from which the usual valve is removed, and air under pressure may be supplied to the tire through a filling stem 15 equipped with a valve, partially indicated at 16, similar to that ordinarily used in connection with automobile tires, and covered by a conventional cap 17. The air passes from the filling stem 15 through portage 18 to the interior of the bellows 18 and enters the hollow stem 4 which communicates with the tire. The air pressure within the bellows is, therefore, the same as that contained within the tire. Such air pressure tends to expand the bellows, and in order that the condition of expansion may be utilized to indicate the air pressure, a spring 19 acts upon the disk 8 to oppose such expansion. When the disk 8 moves axially responsive to pressure changes, it imparts rotation to the indicator disk, and the pressure is indicated by the position of the indicator disk indicia relative to the pointer 20.

The form of the invention illustrated in Figs. 3 and 4 operates on the same principle as those above described. This form, however, provides for a greater amount of axial movement of the disk which closes the upper end of the Sylphon bellows. Referring to these views, 30 designates a cylindrical casing whose end wall 31 is mounted on the valve tube 32 of a tire. Secured to the end wall 31 is a Sylphon bellows 33 whose upper end is closed by a disk 34 having an axial, tubular extension 35 extending downwardly and into the tube 32. A closure member 37 at the upper end of the casing 1 rotatably supports a stem 38 in which is formed a spiral groove or shrouded cam 39. A pin 40, carried by the extension 35 operates in the groove 40 whereby axial movement of the disk 34 imparts rotary movement to the stem 38, in the manner described more in detail above. A spring 41 opposes movement of the disk 34 so that its axial movement will have a definite relationship with pressure changes in the bellows 33. Mounted on the stem 38 is an indicia bearing disk 42 which is exposed through openings 43 in the closure member 37, and these openings are covered by a transparency 44.

Fig. 7 illustrates an alternative mounting for a gauge of the type described with reference to Figs. 1 and 2 or 3 and 4. Referring to this view, the numeral 50 designates a wheel having a hub cap 51. The wheel, obviously, may be of the disk type or of the newer type stamped wheels having formations simulating spokes of an artillery wheel. The gauge 52 is mounted in the hub cap and is connected to the interior of the tire 53 by a stem 54. The tire pressure is thus indicated through the hub cap.

Figs. 5 and 6 illustrate the form shown in Figs. 3 and 4 adapted to indicate through the side of the casing. In this case the casing 30a has an opening 55 in the side thereof and the indicator disk 42a bears indicia on the periphery thereof which is exposed through the opening.

Although specific embodiments of the invention have been illustrated and described, it will be understood that various changes may be made within the scope of the appended claims without departing from the spirit of the invention, and such changes are contemplated.

What I claim is:

1. A tire gauge adapted to remain permanently on a tire, said gauge comprising a cylindrical body having a rigid closure at one end and a transparent closure at its other end, means in the rigid closure for mounting the body on the hollow stem of a tire, a bellows having one end secured to said rigid closure, a disk closing the other end of said bellows, a rotary indicator disk adjacent the transparent closure, means mounted in said transparent closure for rotatably supporting said indicator disk, and means for converting axial movement of said bellows disk into rotary movement of the indicator disk.

2. In a pressure gauge for a pneumatic tire having an external hollow stem, a hollow body having an aperture in a wall thereof to receive the stem, a bellows member in said body and having a rectilinearly movable tubular portion operable in response to changes in pressure acting on said bellows member, a rotatable pressure indicator in said body and visible from externally thereof, said indicator having a stem portion received in said tubular portion, one of said portions having a cam and the other of said portions having a follower cooperable with said cam to change rectilinear movement of said tubular portion to rotary movement of said indicator, and spring means to oppose yieldably movement of said indicator by said bellows member, said cam having an inclination such that sudden impacts will not move said bellows.

3. In a pressure gauge for a pneumatic tire having an external hollow stem, a hollow body having an aperture in a wall thereof to receive the stem, means to secure said body to said stem, a bellows surrounding the stem and having one end secured and hermetically sealed to said wall, a rectilinearly movable closure member secured and hermetically sealed to the other end of said bellows and having a tubular portion extending through said bellows into and guided by the stem, spring means opposing expansion of said bellows, a rotatable pressure indicator in said body and having a stem portion received in said tubular portion, said body having an opening overlying said indicator, a transparent closure member closing said opening and carrying said indicator, said portions having means to transfer rectilinear movement of said bellows to rotary movement of said indicator and resisting sudden impacts to prevent vibratory movement of said bellows.

4. In a pressure gauge for a pneumatic tire having an external hollow stem, a hollow body having an aperture in a wall thereof to receive the stem, a bellows member in said body and having an extended portion rectilinearly movable in response to changes in pressure acting on said bellows member, a rotatable pressure indicator in said body and visible externally thereof, said indicator having an extended portion in telescoping relation with said first-named extended portion, one of said portions having a cam and the other of said portions having a follower cooperable to change rectilinear movement of said first-named extended portion to rotary movement of said indicator, and spring means to oppose yieldingly movement of said indicator by said bellows member, said cam having an inclination such that sudden impacts against the tire will not move said bellows.

WILLIAM S. CLARKSON.